Sept. 1, 1936.   G. H. LELAND   2,052,635
METHOD AND APPARATUS FOR CONTROLLING LEVEL
Filed July 11, 1932
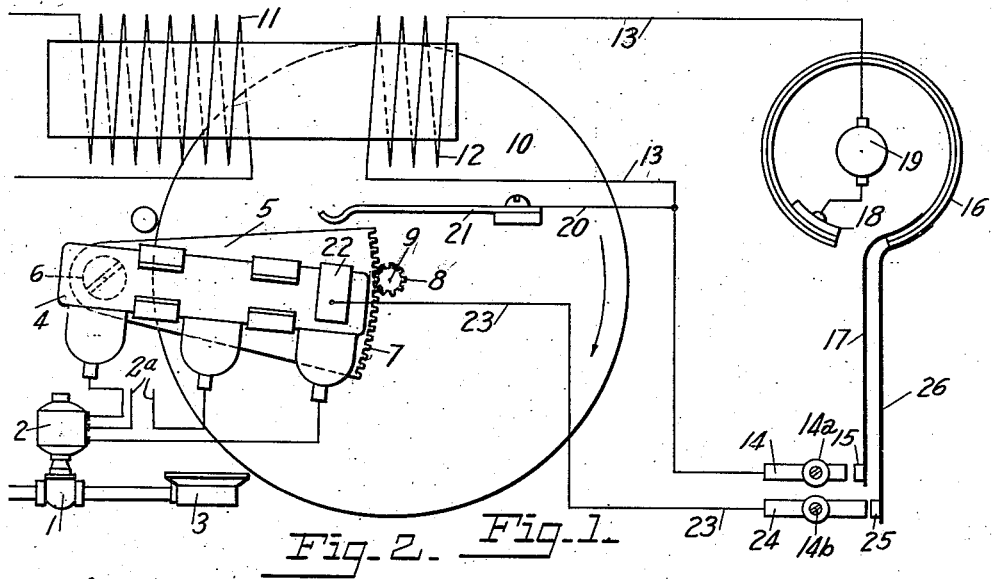
Fig. 2.   Fig. 1.
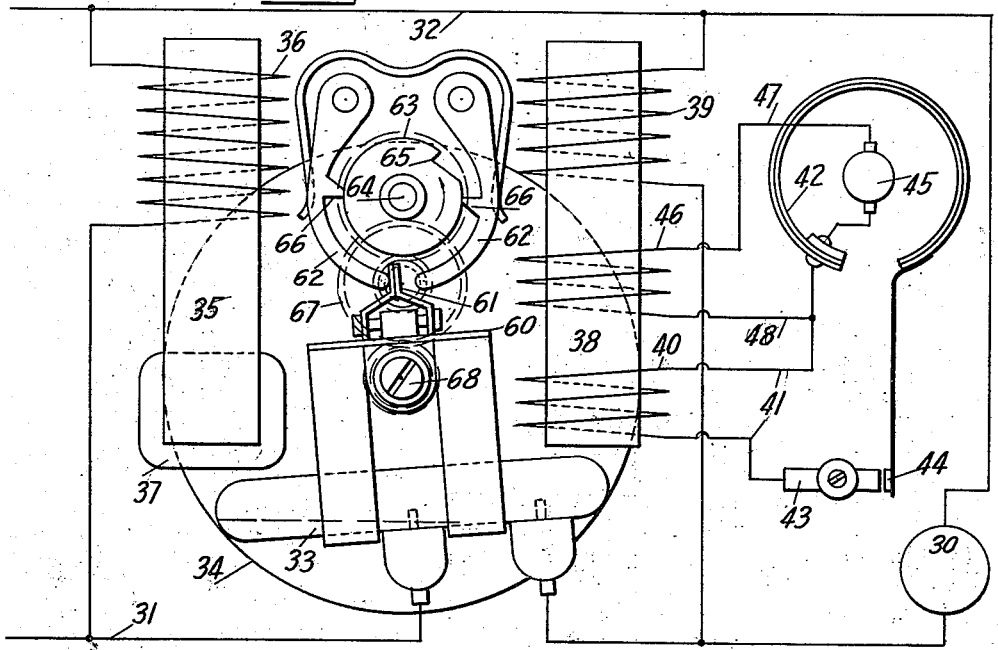
Fig. 3.   Inventor
GEORGE H. LELAND.
by
his Attorney Patented Sept. 1, 1936

2,052,635

UNITED STATES PATENT OFFICE 2,052,635

METHOD AND APPARATUS FOR CONTROLLING LEVEL

George H. Leland, Dayton, Ohio, assignor of one-half to The Leland Electric Company, Dayton, Ohio, a corporation of Ohio Application July 11, 1932, Serial No. 621,942

7 Claims. (Cl. 236—74)

This invention relates to a method and apparatus for controlling the level of a substance or combination of substances, the term "level" being used in its broad sense and meaning condition or status. For example, the invention may be used for maintaining the atmosphere in a building at a substantially constant temperature or humidity; for maintaining a liquid in a reservoir at a substantially constant level; for maintaining fluids at a substantially constant pressure, and for many similar purposes. The devices heretofore employed for these purposes have been of such a character as to require a substantial change in the level before the controlling mechanism will operate to restore the level to normal. In many cases the change of level required is so great that a constant or uniform level cannot be maintained, but there is a continued fluctuation above and below the desired level. In some cases the time lag between the operation of the controlling device and the correction of level is such that the departure from the desired level will be materially increased before correction takes place. This condition is typified by the usual residential heating plant of the hot water type having a thermostatic temperature control. In such a plant there may be a time lag of as much as thirty minutes after the heat under the boiler has been increased by the operation of the thermostat before the water circulating through the radiators is heated sufficiently to affect the temperature in the rooms. Consequently the room temperature will continue to drop during this interval. Assuming that the thermostat has a two degree differential range, say from seventy degrees to seventy-two degrees, the room temperature may drop several degrees below the low side of the differential, that is, below seventy degrees, before correction begins. When the room temperature has been raised to seventy-two degrees the thermostat will operate to cut off the supply of fuel, to close a damper or to otherwise decrease the heat under the boiler, but the water, having been heated to a high temperature, will continue to transmit heat to the rooms and the room temperature may rise several degrees above the differential range, that is above seventy-two degrees, before it begins to fall. Thus the actual variations in room temperature may be as much as ten degrees or more, even though the thermostat has a differential of but two degrees.

One object of the present invention is to provide a method of level control which will enable the substance under control to be maintained at a substantially constant level.

A further object of the invention is to provide a method of control whereby the initiation and termination of the corrective action may be effected alternately at intervals irrespective of any change in the level of the substance which is under control and a substantially constant level maintained.

A further object of the invention is to provide a method of control whereby the initiation and termination of the corrective action may be effected alternately at intervals irrespective of any change in the level of the substance which is under control and the relative duration of said intervals determined in accordance with the existing level of the substance under control.

A further object of the invention is to provide a method of temperature control whereby a thermostat may be actuated at intervals independently of variations in the room temperature to initiate and terminate corrective action and the relative duration of the intervals between successive actions of said thermostat will be controlled in part by the room temperature, thereby maintaining the room temperature within the differential range of the thermostat.

A further object of the invention is to provide a simple efficient apparatus for carrying out the aforesaid method.

A further object of the invention is to provide such an apparatus having auxiliary means for determining the duration of the corrective action.

Other objects of the invention will appear as the method and apparatus are described in detail.

In the accompanying drawing Fig. 1 is a diagrammatic view of one form of apparatus, showing the same as designed for temperature control; Fig. 2 is a view partly in elevation and partly diagrammatic illustrating another form of temperature control apparatus; and Fig. 3 is a side elevation of an apparatus for controlling liquid level.

In carrying out my invention I provide a suitable level changing device and means influenced by the level of the substance under control for controlling the operation of that device. The level changing device and its controlling means may be of the usual or any suitable character for correcting the level of the particular substance which is to be controlled. For example, it may consist of any of the usual thermostatically controlled devices for increasing or decreasing the fire in a furnace, or it may consist of a float controlled valve for controlling the delivery of liquid to a reservoir. For the purpose of avoiding relatively wide variations in the level I provide means operating independently of the level of the substance under control to cause the level changing device to operate periodically, the relative duration of the operative and inoperative periods being determined in accordance with the existing level of the substance under control. These corrective actions will be initiated and terminated at intervals, the relative duration of which will be such as to maintain the level substantially constant. When the existing level is at or near a predetermined lower limit the corrective action will be of long duration with relation to the intervals between corrective actions and as the level is gradually raised the intervals between corrective actions will increase in duration with relation to the intervals of corrective action, until, at an upper predetermined limit, the intervals between corrective actions will be much longer than the periods of corrective action. This may be accomplished by varying the duration of either or both intervals in accordance with the existing level.

For the purpose of illustration I have, in Fig. 1, shown a simple form of the invention embodied in a temperature controlling apparatus adapted to be applied to a residential heating plant. As there illustrated, the device for changing temperature level consists of a valve 1 operated by an electric motor 2 to control the admission of gas to a burner 3. The motor is connected with a power line 2a and its operation is controlled by a load switch 4 which is actuated by suitable mechanism under the control of the apparatus to be hereinafter described. The actuating mechanism for the load switch may be of any suitable character but I prefer to utilize a mechanism comprising a transformer relay which has a primary winding connected with a source of alternating current and a secondary winding to control the operation of a movable device operatively connected with the load switch. The current induced in the secondary winding, while sufficient to cause the operation of the movable device, is of low voltage and may be controlled by a light switch, the operation of which will in turn control the operation of the load switch, which may carry high voltage. In the present instance the load switch 4 is a mercury tube switch and is mounted on a supporting member or bracket 5 which is pivotally mounted near one end, as shown at 6, and has at its other end a toothed segment 7 which meshes with a pinion 8 on the shaft of an electric motor. Preferably this motor is an induction motor of a well known type and consists of a rotatable armature or disk 10 rigidly secured to the shaft 9 and extending between the poles of a magnet which, as here shown, is provided with a primary winding 11 connected with a source of alternating current. The poles of the magnet are provided with shading coils or secondary windings, one of which is shown at 12, and these shading coils are connected in a circuit 13. When the circuit 13 is closed the shading coils will be energized and will cause the disk 10 to rotate in a direction to move the toothed segment 7 upwardly and thus tilt the load switch 4 to a position to cause the motor 2 to operate in a direction to open the valve 1 and admit gas to the burner, thereby initiating the corrective action. When the circuit 13 is broken the shading coils will be deenergized and the disk 10 released from control of the magnet so that the load switch may then move by gravity to its opposite position and thereby cause the motor to operate in a direction to close the valve and terminate the corrective action.

The circuit 13 for the secondary winding of the magnet is controlled by a switch which, in the present instance, consists of a contact member 14 connected with one side of the circuit and which is normally stationary but is adjustable. As here shown, the contact member is slidably mounted in a fixed stud 14a and is held in adjusted positions therein by a set screw 14b. A movable contact member 15 is connected with the other side of the circuit 13 and is controlled by a thermostat 16. As here shown, the contact member 15 is carried by a resilient arm 17 which is secured to the thermostat. The thermostat may be of any suitable character and is here shown as a simple bimetallic bar bent to approximately circular shape and having one end rigidly mounted on a fixed bracket 18. It is preferable, but not necessary, that the thermostat and the contact arm 17 should be connected into and form a part of the circuit for the secondary winding. It will be apparent that when the thermostat is expanded by a rise in temperature the controlling switch will be opened and as the temperature falls the thermostat will contract and close the switch, thus initiating the corrective action which continues until the temperature has risen sufficiently to again expand the thermostat sufficiently to open the switch. The thermostat is so constructed that it will have the desired differential range, which preferably is a range of two degrees, as from seventy degrees to seventy-two degrees. The thermostat is, of course, mounted in the room where the temperature is to be regulated and is usually remote from the load switch and its operating mechanism. As has been explained above the room temperature will sometimes rise or fall considerably above or below the differential range of the thermostat, because of the time lag or other conditions, and in order to avoid this relatively wide variation in the temperature I provide power means for actuating the thermostat independently of room temperature. The power means may be of any suitable character and may conveniently take the form of an electric heating element, which is here shown as an electric lamp, 19, connected in the circuit 13 and arranged within the thermostat 16. When the room temperature is at or near the lower predetermined limit the controlling switch 14—15 will be closed and will cause the load switch to be actuated to initiate the corrective action by admitting gas to the burner. The closing of the controlling switch also closes the circuit through the heating element 19 and the thermostat is thereby subjected to a temperature which is greater than the temperature of the surrounding atmosphere and which will cause the thermostat to open the controlling switch after an interval of predetermined duration, say three minutes. If the room temperature is low, that is, is at or near the lower predetermined limit, the thermostat will contract quickly after the circuit for the heating element has been broken and the controlling switch will be again closed after a relatively short interval. As the temperature in the room gradually rises the thermostat will contract more slowly and the intervals between operations of the burner, that is, between corrective actions, will be of increasing length and when the room temperature reaches the upper predetermined limit the intervals between successive corrective actions will be very much longer than the duration of those actions. When external conditions remain substantially uniform the apparatus will eventually find its balance at a point between the upper and lower limits and will maintain the temperature at that level with practically no change. Should external conditions change, that is, should the outdoor temperature fall rapidly, the intervals between operations of the burner will be decreased so that additional heat will be supplied at intervals sufficiently frequent to maintain the temperature at the desired level. On the other hand should the outdoor temperature rise the intervals between operations of the burner will be increased in length, and should the outdoor temperature rise above the upper limit of the thermostatic range the controlling switch will remain open.

The thermostat being quite sensitive will respond to very slight changes in temperature and in some cases it may be desirable to provide auxiliary means for maintaining the secondary circuit of the magnet closed for the desired interval. In the present instance, I have accomplished that result by providing a shunt circuit about the controlling switch, which shunt circuit contains two switches one of which is controlled by the thermostat and the other is controlled by the position of the load switch. In the arrangement illustrated a conductor 20 is connected with the secondary circuit 13, between the secondary winding and the fixed contact 14, and leads to a contact member 21 arranged above the load switch 4 in such a position that it will be engaged by a contact member 22 carried by the load switch when the latter is moved to its upper position. Leading from the contact member 22 is a flexible conductor 23 which is connected with a fixed but adjustable contact 24 with which cooperates a movable contact member 25 which is connected with the free end of the thermostat by a resilient arm 26. The movable contact 25 and the arm 26 are so arranged that the contact 25 will engage the fixed contact 24 before the movable contact 15 engages the fixed contact 14, but inasmuch as the switch 21—22 is at this time open the shunt circuit remains open. The continued contraction of the thermostat will subsequently cause the movable contact 15 to engage the fixed contact 14 and energize the motor magnet. The resilient arm 26 is of thin light metal so that it offers no appreciable resistance to the continued movement of the thermostat. As soon as the load switch is moved to its upper position the contact 22 will engage the contact 21 and thus complete the shunt circuit independently of the controlling switch 14—15. When the thermostat expands and opens the controlling switch 14—15 the shunt circuit 24—25 will remain closed until there has been a further expansion of the thermostat, thereby maintaining the magnet energized for a longer period than would be possible with the controlling switch 14—15 alone.

It will be apparent that with obvious changes the invention may be utilized to control the operation of a cooling apparatus as well as the operation of a heating apparatus. To further illustrate the adaptability of the invention I have shown in Fig. 2 an arrangement designed for the operation of an automatic stoker for a heating plant, or for like purposes. The stoker is operated by a motor 30 which is connected in a circuit comprising conductors 31 and 32. A load switch 33 is interposed in the motor circuit and is automatically actuated at intervals to initiate and to interrupt the operation of the motor. In the present instance, it is operated by an induction motor comprising a disk 34 operated by a magnet 35 having a primary winding 36 connected across the conductors 31 and 32, in advance of the switch 33, and a closed secondary winding 37. The disk is connected with the switch 33 through suitable actuating mechanism to cause that switch to be tilted alternately to its open and closed positions at intervals. In the arrangement here illustrated the switch 33 is carried by a tilting support 60 having an actuating arm 61. Spring actuated trip arms 62 are arranged on opposite sides of the actuating arm 61 to move the same in opposite directions. Mounted between the trip arms 62 is a cam 63 mounted on a shaft 64 and having a peripheral notch 65. Each trip arm has a projection or nose 66 adapted to normally engage the periphery of the cam and hold its arm in a retracted position, and to enter the notch in the cam, when the latter is moved into line therewith, and release its arm for movement by the spring. Thus the switch will be tilted once in each direction upon each complete rotation of the cam. The cam is rotated at a predetermined speed through suitable reducing gear 67 which connects the same with a shaft 68 of the motor.

The motor operates continuously to actuate the switch even though there may be no requirement for additional heat but the intervals between operations are such that the stoker will supply merely sufficient fuel to keep the fire burning without materially increasing the heat. When additional heat is required the operative periods of the motor are increased in duration so as to supply larger quantities of fuel. For this purpose a second magnet 38 is applied to the motor disk and comprises a primary winding 39 which is connected with the side 31 of the motor circuit between the switch 33 and the motor, and also with the other side 32 of the motor circuit, so that the circuit is closed through this primary winding whenever the load switch 33 is closed. The magnet 38 also has a secondary winding 40, the circuit 41 of which includes a thermostat 42 and a controlling switch comprising a fixed contact 43 and a movable contact 44 carried by the thermostat. When the controlling switch is closed by the contraction of the thermostat, and the circuit thus closed through the secondary winding of magnet 38, this magnet exerts upon the disk a force opposed to the force of the magnet 35 and substantially equal thereto so that the rotation of the disk will be interrupted and the disk held stationary so long as the magnet 38 is energized. A heating element 45 arranged adjacent to the thermostat is connected with a second secondary winding 46 on the magnet 38 through a conductor 47 and a conductor 48 which connects one side of the secondary winding 46 with the circuit 41 of the secondary winding 40. If the load switch 33 is in its closed position at the time the controlling switch 43—44 is closed the magnet 38 will be instantly energized and the motor stopped thus retaining the load switch in its closed position and maintaining the operation of the motor 30 until the thermostat has been actuated to open the circuit for the secondary winding 40 for the magnet 38, thereby permitting the operation of the disk by the magnet 35 to be resumed. If the switch 33 is in its open position when the switch 43—44 is closed the magnet 38 will not be energized until the load switch 33 has been moved to its closed position so as to complete the circuit to the primary winding of the magnet 38. The heating element 45 may if desired, be connected in circuit with the switch 43—44, but by providing a separate circuit for the heating element a more satisfactory operation is secured.

In Fig. 3 I have shown a form of the invention adapted to control the level of liquid in a reservoir. As there illustrated a motor 50 controls a valve, pump or other instrumentality for delivering liquid to or the withdrawal thereof from a reservoir. This motor is connected in circuit with a switch 51, preferably of the mercury tube type, which is mounted upon the one end of a lever 52, the other end of which is pivoted on a float 53 which rests upon the body of liquid. The lever is moved about its pivotal support on the float, to tilt the switch, by a cam or eccentric 54 which is mounted on a shaft 55 and continuously rotated by mechanism not here shown. The shaft 55 rotates on a fixed axis and the eccentric is so arranged that when the float is between upper and lower predetermined levels the eccentric will raise and lower the free end of the lever sufficiently to cause the switch to be moved from its open to its closed position and vice versa. As the float rises the inclination of the lever 52 is changed so that the switch will be held in its closed position for intervals of decreasing duration and when the float reaches the uppermost limit of its movement the inclination of the lever may be such that the eccentric cannot move the free end of the lever high enough to close the switch. Likewise as the float moves downwardly the duration of the closed periods will be increased and when the float reaches or passes the lower predetermined level the inclination of the lever, in the opposite direction, may be such as to hold the switch constantly closed regardless of the position of the eccentric. With this arrangement the float will gradually find an intermediate or balanced position in which the duration of the intervals during which the switch is closed will be of such a length that the liquid supplied to the reservoir will be substantially equal to the withdrawals and the level will remain substantially stationary. Such an arrangement is especially valuable where the reservoir is located at a point distant from the source of supply and considerable time is required for the fluid to travel from the source of supply to the reservoir. With the ordinary controlling mechanism the level of the liquid in the reservoir may fall to an abnormal level before additional liquid can reach the same after the controlling mechanism has been operated, or the quantity of liquid in the conduit between the source of supply and the reservoir at the time the float operates to cut off the supply may be such as to raise the liquid to an abnormal height. With the present invention this cannot happen because liquid is supplied to the reservoir at constantly recurring intervals in quantities sufficient to maintain the same at the desired level.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. In a temperature controlling apparatus, an electric motor to control a temperature changing device, a switch to control the operation of said motor, a second motor to cause said switch to be operated at intervals, an electric device in circuit with said switch to interrupt the operation of said second motor while said switch is closed, a switch in circuit with said electric device, a thermostat operatively connected with the last mentioned switch, and means to actuate said thermostat independently of the temperature of the surrounding medium.

2. In a temperature controlling apparatus, an electric motor to control a temperature changing device, a switch to control the operation of said motor, an induction motor to cause said switch to be opened and closed at intervals, said induction motor comprising a disk and a constantly energized magnet to rotate said disk, a second magnet arranged to oppose the rotation of said disk by the first mentioned magnet and having a primary winding in circuit with said switch, and a secondary winding, a second switch in circuit with said secondary winding, a thermostat operatively connected with said second switch, and means to actuate said thermostat independently of the temperature of the surrounding medium.

3. In a temperature controlling apparatus, an electric motor to control a temperature changing device, a switch to control the operation of said motor, an induction motor to cause said switch to be opened and closed at intervals, said induction motor comprising a disk and a constantly energized magnet to rotate said disk, a second magnet arranged to oppose the rotation of said disk by the first mentioned magnet and having a primary winding in circuit with said switch, and a secondary winding, a second switch in circuit with said secondary winding, a thermostat operatively connected with said second switch, a heating element adjacent to said thermostat, and a second secondary winding on said second magnet connected in circuit with said heating element.

4. In a temperature controlled apparatus, electrically controlled means to cause changes in temperature, a load switch to control said electrically operated means, a motor comprising a rotatable disk, and a magnet to control the rotation of said disk, means for operatively connecting said disk with said switch, a controlling switch in circuit with the winding of said magnet, means to actuate said controlling switch including a device which is movable by changes in temperature level, and means to actuate said device independently of said temperature level.

5. In a temperature controlling apparatus, an electric motor to control a temperature changing device, a switch to control the operation of said motor, an induction motor to cause said switch to be opened and closed at intervals, said induction motor comprising a disk and a constantly energized magnet to rotate said disk, a second magnet to oppose the rotation of said disk by the first mentioned magnet having a primary winding in circuit with said switch, and a secondary winding, a switch in circuit with said secondary winding and a thermostat operatively connected with said switch.

6. In a temperature controlling apparatus, electrically controlled means to cause changes in temperature, a load switch to control said electrically controlled device, a motor comprising a rotatable disk and a magnet to control the rotation of said disk, means for operatively connecting said disk with said switch, a controlling switch in circuit with the winding of said magnet, and means to actuate said controlling switch including a device which is movable by changes in temperature level.

7. In an apparatus comprising an electrically operated mechanism and a load switch for controlling the operation thereof, means for actuating said load switch including a movable device, a magnet and transformer comprising a unitary structure having a primary winding adapted to be connected with a source of alternating current and also having a secondary winding to control the movement of said movable device and said load switch, and a switch in circuit with said secondary winding, whereby the opening and closing of the circuit for the low voltage induced current will control the operation of said load switch.

GEORGE H. LELAND.